(12) United States Patent
Markesbery et al.

(10) Patent No.: US 10,729,194 B2
(45) Date of Patent: Aug. 4, 2020

(54) GARMENT WITH STRATEGICALLY POSITIONED POLYMIDE AEROGEL PANELS

(71) Applicant: LUKLA LLC, Cincinnati, OH (US)

(72) Inventors: Michael Glenn Markesbery, Cincinnati, OH (US); Rithvik Venna, Broadview Heights, OH (US)

(73) Assignee: LUKLA INC., Cincinnati, OH (US)

( * ) Notice: Subject to any disclaimer, the term of this patent is extended or adjusted under 35 U.S.C. 154(b) by 0 days.

(21) Appl. No.: 15/573,719

(22) PCT Filed: May 13, 2016

(86) PCT No.: PCT/US2016/032350
§ 371 (c)(1),
(2) Date: Nov. 13, 2017

(87) PCT Pub. No.: WO2016/183440
PCT Pub. Date: Nov. 17, 2016

(65) Prior Publication Data
US 2018/0084853 A1    Mar. 29, 2018

Related U.S. Application Data

(60) Provisional application No. 62/160,904, filed on May 13, 2015, provisional application No. 62/160,797, filed on May 13, 2015.

(51) Int. Cl.
*B32B 3/00* (2006.01)
*A41D 31/00* (2019.01)
*A41D 31/06* (2019.01)
*B32B 3/16* (2006.01)
*B32B 5/02* (2006.01)
*B32B 27/28* (2006.01)

(52) U.S. Cl.
CPC ......... *A41D 31/0033* (2013.01); *A41D 31/06* (2019.02); *A41D 31/065* (2019.02); *B32B 3/16* (2013.01); *B32B 5/024* (2013.01); *B32B 27/281* (2013.01); *A41D 2400/10* (2013.01); *B32B 2307/304* (2013.01); *B32B 2437/00* (2013.01); *Y10T 428/16* (2015.01)

(58) Field of Classification Search
CPC ... Y10T 428/16; Y10T 428/2476; B32B 3/00; B32B 5/024; A41D 31/0033; A41D 2400/10
See application file for complete search history.

(56) References Cited

U.S. PATENT DOCUMENTS 6,332,221 B1   12/2001   Gracey
6,855,410 B2    2/2005   Buckley
(Continued)

FOREIGN PATENT DOCUMENTS

WO         2013136.34 A1    1/2013

*Primary Examiner* — Alexander S Thomas
(74) *Attorney, Agent, or Firm* — Wood Herron & Evans LLP

(57) ABSTRACT

An apparel garment includes a polyimide aerogel or aerogel-infused insulator 12 directly bonded to at least a portion 10 of the garment. A method for bonding an aerogel to an insulator 12 for an apparel garment includes providing a polyimide aerogel component, which may be a powder or other form, and directly bonding the polyimide aerogel component to the apparel garment. The bonding may be through at least one of thermal, chemical (adhesive/solvent), hydrogen, and mechanical bonding.

8 Claims, 2 Drawing Sheets

(56) References Cited

U.S. PATENT DOCUMENTS

2008/0289078 A1    11/2008   Mather
2009/0082479 A1    3/2009   Cho
2012/0164431 A1    6/2012   Sandler et al.
2013/0212771 A1    8/2013   McFarlane

GARMENT WITH STRATEGICALLY POSITIONED POLYMIDE AEROGEL PANELS

CROSS-REFERENCE TO RELATED APPLICATIONS

This application claims priority to U.S. Provisional Application Ser. No. 62/160,797, filed on May 13, 2015, and U.S. Provisional Application Ser. No. 62/160,904 filed on May 13, 2015, the complete disclosures of which are expressly incorporated herein by this reference.

FIELD OF THE INVENTION

The present invention relates generally to the use of thermal insulation materials in apparel and, more particularly, to the use of polyimide aerogel infused panels in a garment and the placement of the insulating panels in patterns based upon the thermal needs of the body.

BACKGROUND OF THE INVENTION

Typical outerwear involves three layers of fabric: a waterproof outer shell, a warm layer of insulation, and an inside wicking layer. Insulating layers have been used for some time in articles of clothing to provide protection and comfort. The insulating layer, when used in combination with the overlaying outer shell, shields the user against uncomfortably cold or hot temperatures and high levels of moisture. Various insulating materials for insulating liners that have been used in the textile industry include felt, fleece, flannel, wool, various forms of latex foam, or the like. Although flexible and readily adaptable for textile applications, such materials are often provided in relatively thick slabs that can be bulky, thereby requiring the user, for example, to use a larger sized garment in order to fit the insulating material or liner. Also, such materials often do not exhibit effective insulative properties in extremely high or extremely low temperature environments.

Silica-based aerogels have been known to exhibit excellent thermal insulation performance, and have been readily adapted for use in high temperature thermal insulation and cryogenic thermal insulation applications including, for example, advanced space suits developed by NASA. Aerogels, as that term is used herein, include polymers with pores with less than 50 nanometers in porous diameter. In a process known as sol-gel polymerization, monomers are suspended in solution and react with one another to form a sol, or collection, of colloidal clusters. The larger molecules then become bonded and cross-linked, forming a nearly solid and transparent sol-gel. An aerogel of this type can be produced by carefully drying the sol-gel so that the fragile network does not collapse.

In the textile and/or apparel industry, silica-based aerogel components have been bonded to apparel fabric for uses such as providing additional insulation. Aerogel is the lowest thermal conductive solid in existence; meaning heat transfer through the aerogel is very limited. However, breathability of aerogel is almost non-existent. Furthermore, aerogel, relative to alternative forms of insulation, is less flexible. Methylated silica aerogel blankets were the first form of flexible aerogel used in textiles or garments. These thermal insulating blankets were developed in cooperation between NASA and Aspen Aerogel, and comprise a combination of methylated silica aerogel (a normally brittle substance) with fibers (typically PET or polyester).

One difficulty with using conventional silica aerogels is that the aerogel tends to shed a fine dust, even when supported by a carrier material. If the aerogel material is not properly contained and sealed within a liner assembly, the dust particles may escape the liner and into the atmosphere. While the dust is not harmful, it is extremely hydrophobic and can cause drying out of skin on contact. To prevent release of the dust from a garment, the aerogel has been encapsulated in another material, typically polyurethane. The aerogel insulating layers have been installed by sewing the outskirts of the polyurethane encapsulation to the fabric of the garment. However, polyurethane is not very breathable and does not have a high thermal resistance. Encapsulation also increases the weight and thickness of the garment. Further, if the polyurethane layer were to be punctured, the garment would be ruined, as the aerogel dust would be released and shed over the garment.

NASA has recently developed a new type of aerogel, a polyimide aerogel, which does not shed a dust. Therefore, insulating layers using this new aerogel do not need to be encapsulated for use in a garment. While polyimide aerogel does not shed dust, it still suffers from the breathability and flexibility issues of the earlier silica-based aerogels.

Prior art garments that have utilized aerogel insulating layers have sought to limit the number of insulating panels or sections, preferring to use just a few, large sections. These garments are often inflexible, and suffer from poor thermal performance (overheating, etc.).

Accordingly, it is desirable to have a garment with the thermal benefits of aerogel, but with increased flexibility and breathability relative to prior aerogel garments. In addition, it is desirable to have a thermoregulating garment which uses directly bonded polyimide aerogel sections as an insulating medium.

SUMMARY OF THE INVENTION

The present invention addresses the shortcomings of the prior art by providing an insulating garment in accordance with several different aspects.

In accordance with one aspect, the invention features an apparel garment, the garment comprising a plurality of supporting panels, each of the supporting panels including a plurality of insulators, of aerogel or aerogel-infused fabric, distributed on the supporting panels according to the heat signature of a human body and being more widely spaced in areas on the panels which fit on an area of the body requiring greater insulation.

In another aspect the invention features a wearable insulated garment comprising a plurality of insulators comprising aerogel-infused fabric, distributed in the garment according to the heat signature of a human body. At least a first and a second insulator have differing densities of infused aerogel, so that the first insulator has a greater density of infused aerogel than the second insulator. In particular embodiments, the first and second insulators are placed to fit on first and second areas of the body, the first area of the body requiring greater insulation than the second area of the body.

In either of these aspects, the insulators may comprise fabric infused with aerogel particles or a polyimide aerogel per se, or a combination of these.

The above and other objects and advantages of the present invention shall be made apparent from the accompanying drawings and the description thereof.

Figure 1A:
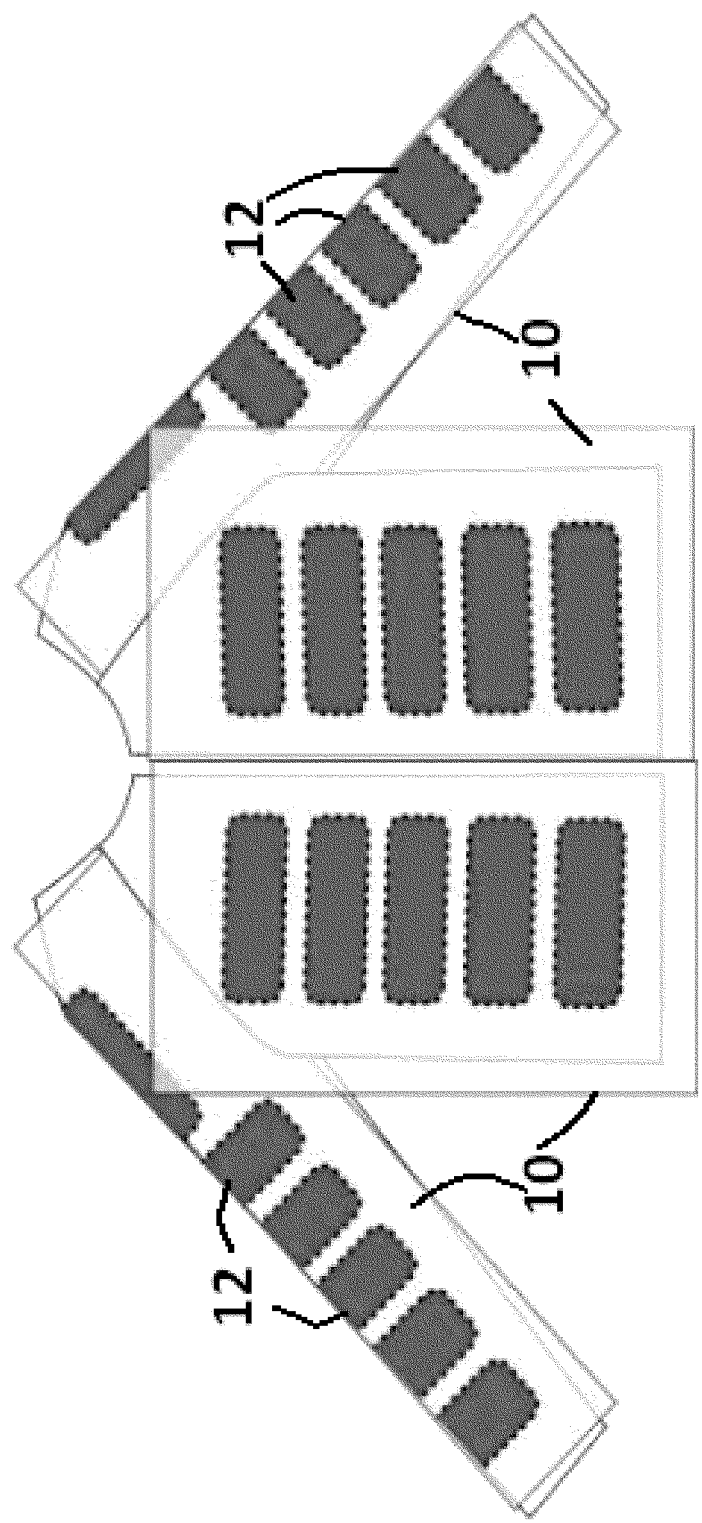
FIGS. 1A and 1B are front and rear views, respectively, of a set of garment panels formed with aerogel insulators in accordance with principles of the present invention.

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE EMBODIMENTS

The embodiments described herein are directed to a garment containing numerous small segments of aerogel insulation covering a large surface area of the garment. The embodiments are further directed to direct bonding or infusion of polyimide aerogel to a light-weight, insulated textile garment of desirable flexibility, durability, and breathability properties. The aerogel may be comprised of a polyimide aerogel, and may be directly bonded to or infused into the garment fabric through any type of textile bonding method including thermal, chemical, hydrogen, and/or mechanical bonding. As used herein, "clothing", "garment" or "apparel" includes not only under and outer wear, but also such things as footwear, gloves, blankets, sleeping bags, and other articles used to provide protection or comfort against the elements.

Polyamide aerogel is a breathable component that does not shed fine dust or particles such as conventional silica-based aerogels do, and conventional silica-based aerogels themselves are not commonly breathable. Further, and in contrast to conventional silica-based aerogels, polyimide aerogels are not extremely hydrophobic. Such extreme hydrophobic qualities of silica-based aerogels cause skin to dry out upon contact, and conventional silica-based aerogels that are extremely hydrophobic typically require hydrophobic treatments to keep a silica aerogel pore structure from collapsing in humid environments.

Moreover, polyimide aerogels have the further advantage that direct contact and/or bonding and/or infusion of polyimide aerogel with a fabric such as an apparel garment fabric will not ruin the fabric and thus increasing the durability of the fabric over those used with conventional silica-based aerogels that require encapsulation to protect the fabric from dust or particles shed by the silica-based aerogels. And, as polyimide aerogels do not require encapsulation prior to bonding with a fabric, a weight and/or inflexibility associated with such encapsulation is reduced as the extra layer added by an encapsulation is no longer required. This absence in encapsulation leads to a reduction of overall thickness and bulk of a garment and thus to a lighter and/or thinner garment for a user to wear.

As an example and not a limitation, the non-shed aerogel component 102 used may be XEOTEX as made by AEROGEL TECHNOLOGIES LLC of Glendale, Wis. As another example and not a limitation, the non-shed aerogel component 102 used may be a polyimide aerogel as developed at NASA's Glenn Research Center. Such three dimensionally bonded polyimide aerogels are synthesized by cross-linking through either an aromatic thiamine or polyhedral oligomeric silsesquioxane, octa-(aminophenyl)silsesquioxane (OAPS) and chemically imidizing at room temperature. Gels form from polyamic acid solutions of a variety of dianhydrides or diamine, and the gels and the polyamine cross-link are chemically imidized using pyridine and acetic anhydride and dried using supercritical CO2 extraction to produce aerogels that have densities in the range of from about 0.08 g/cm3 to about 0.35 g/cm3. The resulting polyimide aerogels are 75-95% porous, have high surface areas in the range of from about 230 m2/g to about 500 m2/g, and have low thermal conductivity such as a thermal conductivity of 14 mW/m-K at room temperature. And the cross-linked polyimide aerogels may be fabricated as both monoliths and flexible and foldable thin films and have a higher modulus than conventional polymerreinforced silica aerogels of a similar density.

Polyimide aerogels as are contemplated herein are approximately 500 times stronger than the conventional fragile and brittle silica aerogels. Also, in contrast to conventional silica-based aerogel products that break down when handled and shed small dust particles as described above, polyimide aerogels are made of an organic-based cross-lined polyimide material that is highly flexible over the conventional silica-based aerogel and is able to be created as foldable thin films and/or manufactured into molded shapes. Polyimide aerogels offer excellent thermal properties and mechanical performance capable of use in a thermal insulation market, for example, such as for use with outdoor apparel wear. Polyimide aerogels include more than 90% air by volume and are significantly lighter and less space-consuming than other conventional insulative materials while providing a similar insulation quality. Polyimide aerogels include low density and high surface area measurements compared to conventional silica aerogels. For example, in comparison to conventional silica aerogels, densities of polyimide aerogels may be as low as 0.08 to about 0.2 g/cm3 and surface areas may be as high as 500 m2/g. Polyimide aerogels are heat resistant and may withstand temperatures up to 400° C. or temperature in the range of from about 250° C. to about 300° C. in continuous use. As polyimide aerogels have high porosity and small pore diameter measurements, polyimide aerogels include excellent thermal and acoustic insulating properties.

Thermal or thermodynamic bonding may include at least the following types of bonding: radiant heat, through-air, ultrasonic, dielectric, flame, extrusion, calendaring, hot bar or iron, hot wedge, and/or laser. Mechanical bonding may include at least the following types of bonding: perforation, entanglement, pressure embossing, stitching, stapling, press fasteners, and/or embroidery. Solvent bonding (a form of chemical bonding) may include solvent cementing as a type of bonding. Adhesive bonding (another form of chemical bonding) may include at least the following types of bonding: solvent, waterborne, hot melt, powder, and/or reactive liquid. Other like bonding methods should be understood to be apparent to those of ordinary skill in the art in view of the teachings herein.

Textile bonding methods to bond materials, such as polyimide aerogels as disclosed herein, to textiles may include, for example, mechanical bonding, hydrogen bonding, chemical bonding, and/or thermodynamic bonding. Adhesives such as water borne, solvent borne, and solid adhesives may be used to create adhesive bonds for textiles. Mechanical bonding includes applying an adhesive as a water or solvent-borne material in a dipping operation, curing, and mechanically locking the hardened adhesive to a textile or fabric. Hydrogen bonding includes utilizing a strong electrical attraction between the adhesive and the fiber but is only usable with industrial textiles having polar fibers. Chemical, or covalent, adhesive bonding utilizes a chemical reaction between the fiber of a textile or fabric and the adhesive. Thermodynamic bonding involves utilizing an adhesive to swell a top fiber layer of the textile or fabric and mechanically lock into the fiber layer and form a durable bond between the fiber and the adhesive. As an example and not a limitation of thermodynamic adhesive bonding is solvent welding.

In embodiments of the present disclosure, polyimide aerogel may be infused/saturated into woven fabrics to yield a dust-free saturated fabric with desirable insulation qualities. Previous aerogels, such as silica based aerogel, resulted in shedding of fine particles when saturated in wovens. As stated above, these fine particles, or dust, would dry out skin upon contact, making traditional aerogels unsuitable for clothing. However, saturation of polyimide aerogel into clothing as described herein can create a thin, lightweight one-layer article of clothing or other fabric article (e.g., sleeping bags or other) with immense insulation abilities as to allow the user to be subjected to incredibly low temperatures while still maintaining thermal performance.

In one embodiment of the present invention the panels formed with infused aerogel are created by the processes described in U.S. Patent Publication 2004/0142168, for "Fibers And Fabrics With Insulating, Water-Proofing, And Flame-Resistant Properties", filed by Hrubesh et al. and published Jul. 22, 2004, which is incorporated herein in its entirety, and in International Patent Application W00106054A1, for "Nanoparticle-Based Permanent Treatment for Textiles", filed by Soane et al and published Jan. 25, 2001, which is also incorporated herein in its entirety. The Soane et al filing discloses "an agent or other payload entrapped, that is, surrounded by or contained within a synthetic, polymer shell or matrix that is reactive to fibers, yarns, fabrics, or webs, to give textile-reactive beads or matrices. The beads or matrices are micrometric or nanometric in size, and are herein collectively and interchangeably referred to as 'nanobeads' and 'nanoparticles.' The nanobead/nanoparticle of the invention may comprise a polymeric shell surrounding the payload or it may comprise a three-dimensional polymeric network entrapping the payload, both of which are referred to herein as a polymer shell."

The payload bead will form a chemical covalent bond with the fiber, yarn, fabric, textile, finished goods (including apparel), or other web or substrate to be treated. The polymer shell or polymer network of the payload nanoparticle has a surface that includes functional groups for binding or attachment to the fibers, filaments or structural components or elements (referred to collectively herein and in the appended claims as "fibers") of the textiles or other webs to be treated, to provide permanent attachment of the payload to the fibers. Alternatively, the surface of the nanobead includes functional groups that can bind to a linker molecule that will in turn bind or attach the bead to the fiber. In either case, these functional groups are referred to herein as "textile-reactive functional groups" or "fiber-reactive functional groups" or "substrate-reactive functional groups." The terms "payload" and "payload agent" refer collectively to any material or agent that would be desirable for permanent attachment to or treatment of a textile or other web. Alternatively, the payload agent may be released from the cage of the payload nanobead in a controlled and prolonged fashion. The chemical linkage on the surface of the nanobead does not involve the molecules of the payload. The payload agents are physically entrapped within the nanoparticle, thus requiring no chemical modifications of the agents themselves. The resulting encapsulated payload preparations or nanoparticles have improved retention within and on the textile or web fiber structure without changing the inherent character of the payload agent. The architecture of the shell or matrix of the nanobead can be formulated and fine-tuned to exhibit controlled release of the entrapped payload, ranging from constant but prolonged release (desirable for drugs, biologic or anti-biologic agents, softeners, and fragrances, for example) to zero release (desirable for dyes, metallic reflector colloids, and sunblock agents, for example). In an encapsulated configuration, the beads will desirably insulate the payload from the skin, preventing potential allergic reactions. In addition, the nanoparticle can be designed to respond to different environmental stimuli (such as temperature, light change, pH, or moisture) to increase the rate of release, color change, or temperature change at certain times or in certain selected spots or locations on the textile or finished good. This invention is further directed to the fibers, yarns, fabrics (which may be woven, knitted, stitch-bonded or nonwoven), other textiles, or finished goods (encompassed collectively herein under the terms "textiles" or "webs") treated with the textile-reactive nanoparticles. Also suitable for the purposes disclosed here are fibers, yarns, fabrics (which may be woven, knitted, stitch-bonded or nonwoven), other textiles, or finished goods (encompassed collectively herein under the terms "textiles" or "webs") treated with the textile-reactive nanoparticles.

According to the principles of the present invention, liquid or paste compositions are applied to textiles for purposes of saturation and/or impregnation by immersion. Flexible webs, including fabric, are applied with a liquid or paste composition, for example, by a so-called padding process wherein the fabric material is passed first through a bath and subsequently through squeeze rollers in the process sometimes called single-dip, single-nip padding. Alternatively, for example, the fabric can be passed between squeeze rollers, the bottom one of which carries the liquid or paste composition in a process sometimes called double-dip or double-nip padding.

According to principles of the present invention, a solvent may be used to aid in the incorporation of the active agent into the web. Known apparatus for the coating of webs, including fabrics, can be used to deposit a coating onto the fabric at a desired thickness. Coating at a predetermined thickness can be achieved by deposition of coating material or by the scraping of a coating upon the fabric by knives. Flexible webs are generally urged between oppositely disposed surfaces, one of which would be a doctoring blade or drag knife. The blade or knife smooth the coating and maintain the thickness of the coating to a desired thickness. Various types of coatings, and various coating thicknesses, are possible. However, a general principle of coating machinery is that the coating material is swept, or dragged, along the surface of the fabric.

The manufacture of fabrics or materials suitable for the present invention may also use methods described in U.S. Pat. No. 6,129,978, for "Porous Webs Having a Polymer Composition Controllably Placed Therein", filed by J. Michael Caldwell and published Oct. 10, 2000, and incorporated by reference herein in its entirety. The Caldwell patent "relates to a porous web comprising a plurality of structural elements with interstitial spaces therebetween, wherein at least some of the structural elements of the top and bottom surfaces of the web are encapsulated by a cured, shear thinned polymer composition and most of the interstitial spaces are open. The invention also relates to a porous web having a substantially continuous region of a cured, shear thinned polymer composition extending through the web so that the polymer composition fills the interstitial spaces and adheres adjacent structural elements of the web in the region. In the areas of the web above and below the filled region, at least some of the structural elements are encapsulated and most of the interstitial spaces are open."

Consistent with the foregoing, principles of the present invention can be carried out using fibers and fabrics that have desirable insulating, waterproofing, and/or fire resistant properties. In various embodiment of the invention, fibers, and fabrics produced from the fibers, are made water repellent, fire-retardant and/or thermally insulating by filling the void spaces in the fibers and/or fabrics with a powdered material. When the powder is sufficiently finely divided, it clings tenaciously to the fabric's fibers and to itself, resisting the tendency to be removed from the fabric. The present invention has many uses including uses for military clothing, blankets, tents, raingear, fire/flame protection clothing, blankets, tents, raingear, fire/flame protection, etc.

More specifically, embodiments of the invention use known manufacturing systems for processing fibers and processing fabrics. The nanoporous powder can be any porous material that exhibits a microstructure consisting of sub-micrometer pores and particles. In some embodiments of the invention the powders should have a composition such that the bulk material is not easily wet by pure water; preferably, the bulk material would make a contact angle greater than 90° with a water droplet on its surface. The powder can be applied to the fibers or to the woven fabric at any time; preferably, by pressing the dry powder into the fibers or fabric in a manner that results in effectively filling the available void spaces. In some embodiments of the invention sol-gel derived and aerogel-like materials are used.

The composite fabric consisting of the fibers and nanoporous powder gives the fabric the properties of lightweight, water-proof, thermal insulating, and fire retarding (if inorganic powders are used). For example, a linen fabric treated with 19% by weight of hydrophobic silica aerogel, completely shed water and its thermal resistance improved by 31% over the same thickness of un-treated fabric. The same treated fabric withstands a flame temperature of 525° F. before scorching, 7 times longer than the untreated fabric.

Hrubesh et al., U.S. 2004/0142168 FIG. 1 shows a side view of a portion of a single fiber made up of strands of smaller fibers. Nanosize particles at least partially fill the inside spaces between the strands of the smaller fibers and also are attached to the outside of the smaller fibers and the single fiber. Hrubesh et al. FIG. 2 illustrates an end view of the fiber, which may have improved insulating, waterproofing, and fire resistant properties. Fibers and fabrics produced from the fibers are made water repellent, fire-retardant and/or thermally insulating by filling the void spaces in the fibers and/or fabrics with a powdered material. When the powder is sufficiently finely divided, it clings tenaciously to the fabric's fibers and to itself, resisting the tendency to be removed from the fabric. Thus, this treatment offers substantial long term improvement of the water repellant and thermal insulation properties over the untreated fabric, while not adding much additional weight to it. The available void spaces in the fibers and between strands of smaller fibers are filled with a nanoporous material (powdered) whose particles and pores are so small that the thermal resistance of the powder is higher than that of the air that the powder is displacing.

Hrubest et al. FIG. 3 shows a schematic drawing of a fabric made of woven fibers with the space between the woven fibers filled with nanosize particles (diameters in the size range from 1-500 nm.) The fabric is made of a multiplicity of fibers and the multiplicity of fibers is associated with each other to form the fabric. The fabric contains void volumes located either in the fibers or between the fibers or both in the fibers and between the fibers. At least a portion of the void volume at least partially filled with particles in the size range of 1-500 nm. In various embodiments of the invention the particles are at least partially composed of: a porous material, or a nanoporous material, or a nanoporous powdered material, or a solgel derived material, or an aerogel-like material, or an aerogel, or an insulating material, or a thermally insulating material, or an insulating material, or a water repellant material, or a hydrophobic material, or a hydrophobic, nanoporous powdered material, or a water repellant material, or a hydrophobic silica aerogel, or a fire resistant material, or a fire resistant material, or a combination of the foregoing materials. In another embodiment, the available void spaces in fibers and fabrics are filled with a nanoporous material (powdered) whose particles and pores are so small that the thermal resistance of the powder is higher than that of the air that the powder is displacing. The powdered nanoporous material is a hydrophobic material that is not easily wet with water. Thus the composite of fabric and powder has improved insulation and waterproofing properties.

Figure 1B:
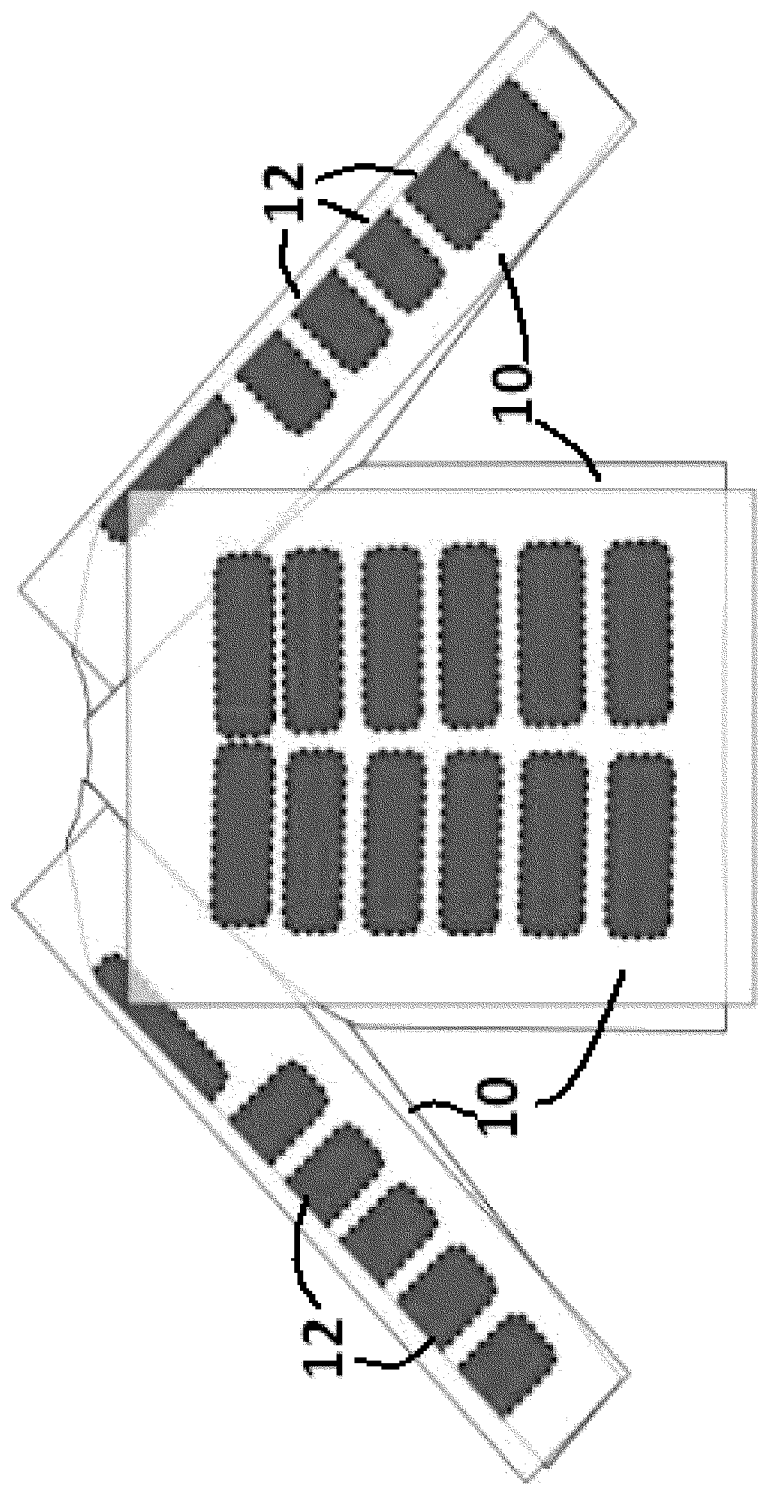

Referring now to the drawing figures appended hereto, wherein like numbers indicate like elements throughout the views, FIGS. 1A and 1B illustrate a garment having a non-shed aerogel panels that are directly bonded to a fabric, or fabric panels with embedded/infused aerogel nanoparticles. The fabric may be, for example, a fabric for use in an apparel industry, such as one forming a coat or other outdoor wear garment including insulated linings and/or materials. The non-shed aerogel component may be directly bonded to the fabric through at least one of thermal, chemical (adhesive/solvent), and/or mechanical bonding as describe above.

In the exemplary embodiment, shown in FIG. 1, an outer wear garment, such as a jacket, is provided with numerous small pieces or sections of polyimide aerogel insulation 12 directly bonded to a fabric 10. In this embodiment, there are five panels 10 including aerogel pieces, one panel on each side of the jacket front, one panel on each of the sleeves, and a single panel on the back of the jacket. The front panels may each measure approximately 70 cm by 30 cm and contain five aerogel pieces, with each of the pieces lying with the long side on the horizontal plane. The back panel may measure approximately 75 cm by 60 cm and may contain twelve aerogel panels spaced apart with two columns of six panels each. Within each column, the aerogel pieces positioned with the longitudinal length along the horizontal plane. Each of the sleeves may contain five aerogel pieces spaced over an area of approximately 80 cm by 50 cm. The piece closest to the shoulder may be positioned with longitudinal length along the vertical plane, and the remaining four pieces may be positioned with the longitudinal length along the horizontal plane. Aerogel or aerogel-infused panels are sewn to attach to a lightweight mesh or liner to hold the panels in position. The panels are visible from the interior of the jacket only, and are spaced across the interior front (FIG. 1A) and interior rear (FIG. 1B) of the jacket. In this embodiment, the jacket includes thirty-four aerogel pieces. The aerogel pieces in the embodiment shown are spaced apart in order to provide for ventilation between the panels. In one exemplary embodiment, the aerogel panels have a size of 18 cm long by 8 cm wide, and the individual panels are spaced approximately 2.5 cm apart.

Aerogel is the lowest thermal conductive solid in existence with heat transfer through an aerogel medium being very limited. Accordingly, heat and sweat may develop beneath the aerogel medium to dissipate. Accordingly, the garments described herein use aerogel-infused fabrics that provide breathability, and further garments may provide for breathability by using a number of smaller-sized aerogel pieces, by spacing the individual pieces apart to provide for ventilation. Heat that may develop under an aerogel sections can be easily dissipated through the spaces or openings between adjacent sections. In addition, the embodiments described herein increase the potential flexibility of the aerogel insulated garment through the addition of spacing between the individual aerogel sections.

Studies have been done to determine location specific heat loss in the human body. These studies have found that the further away a body part is from the core, the more insulation that is required in order to maintain body heat. For example, to prevent heat loss, the lower arm requires more insulation than the upper arm, the lower back requires more insulation than the upper back, the lower leg needs more insulation than the upper leg, and the chest requires more insulation than the abdomen. These are the parts of the body with the most to the least amount of vasoconstriction, meaning additional insulation is warranted to protect from cold injury: nose, cheeks, forehead, toes and heels. Accordingly, in accordance with principles of the present invention, aerogel panels or aerogel-infused fabric is placed less densely or spaced more widely in areas requiring less insulation and more densely in areas requiring more insulation, or the aerogel-infused fabric is infused with less aerogel powder in areas requiring less insulation and more aerogel powder in areas requiring more insulation.

While the embodiments have been described herein in conjunction with the use of polyimide aerogel insulating panels, the garments may also be composed of silica-based aerogel pieces encapsulated in polyurethane. With the silica aerogel pieces, the encapsulated aerogel pieces would be sewed into the garment in the patterns as described, rather than directly bonded to the fabric.

The present invention has been described in connection with several embodiments and some of those embodiments have been elaborated in substantial detail. However, the scope of the invention is not to be limited by these embodiments which are presented as exemplary and not exclusive. The scope of the invention being claimed is set forth by the following claims.

What is claimed is:

1. A wearable insulated garment comprising:
   a. a plurality of insulators, the insulators comprising aerogel-infused fabric,
   b. the insulators being distributed in the garment, at least a first and a second insulator having differing densities of infused aerogel, the first insulator having a greater density of infused aerogel than the second insulator to provide variable insulation in different areas of the body.

2. The garment of claim 1 wherein the first and second insulators are placed to fit on first and second areas of the body, the first area of the body requiring greater insulation than the second area of the body.

3. The garment of claim 1 wherein the insulators comprise fabric infused with aerogel particles.

4. The garment of claim 1 wherein the insulators comprise polyimide aerogel.

5. The garment of claim 4 wherein the polyimide aerogel is a monolith of polyimide.

6. The garment of claim 4 wherein the polyimide aerogel is a flexible film of polyimide.

7. The garment of claim 1 wherein the insulators comprise a silica-based aerogel encapsulated in a barrier layer.

8. The garment of claim 7 wherein the barrier layer is a polyurethane barrier layer.

* * * * *